Figure 2:
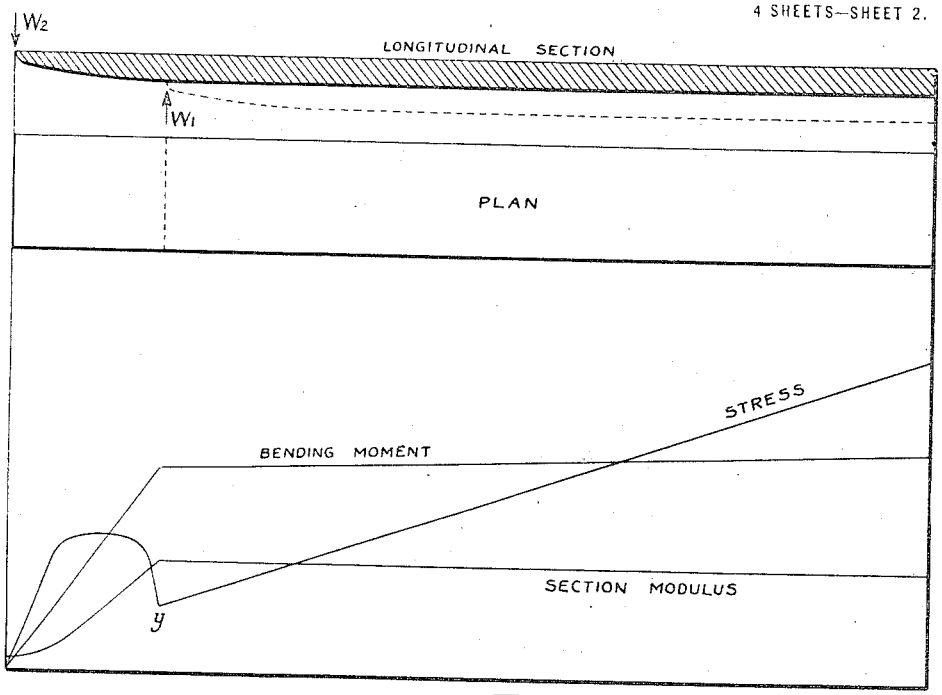

D. LANDAU.
LAMINATED SPRING.
APPLICATION FILED APR. 20, 1916.
1,199,013.
Patented Sept. 19, 1916.
4 SHEETS—SHEET 1.
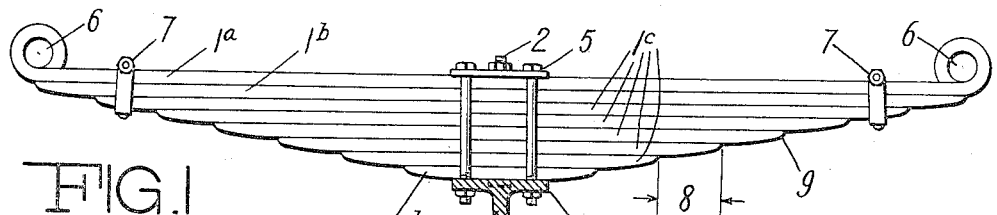
FIG.1
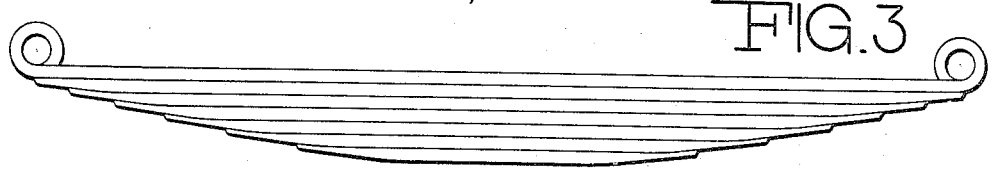
FIG.3
FIG.4
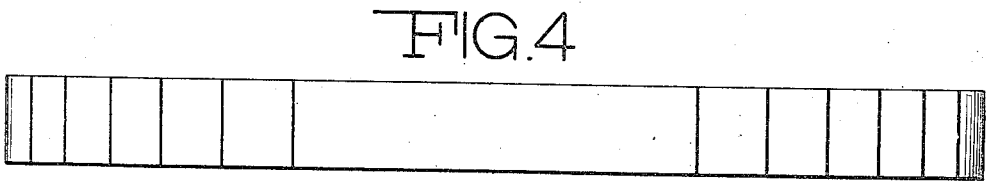
FIG.5
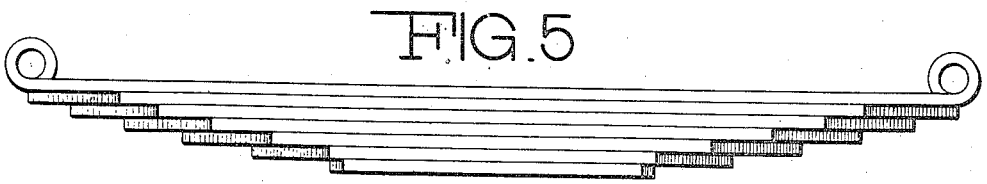
FIG.6
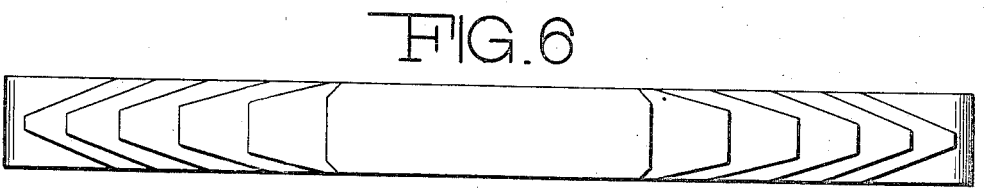
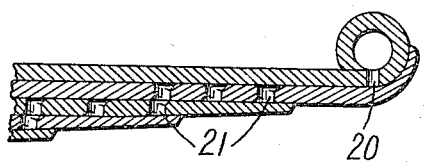
FIG.21
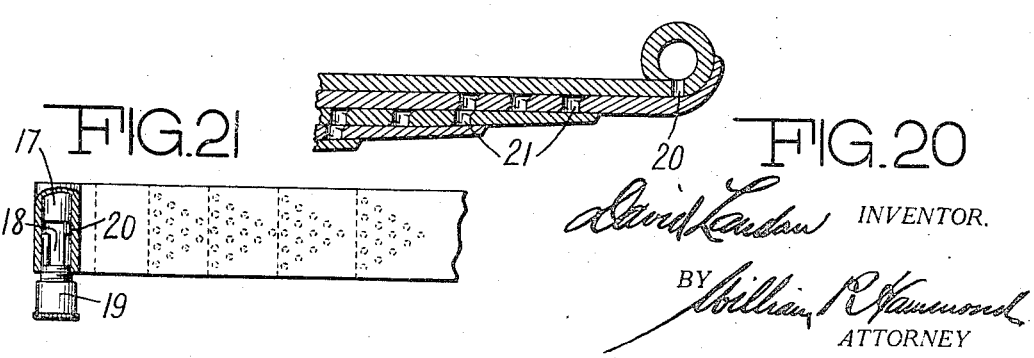
FIG.20
INVENTOR.
BY
ATTORNEY

D. LANDAU.
LAMINATED SPRING.
APPLICATION FILED APR. 20, 1916.

1,199,013.

Patented Sept. 19, 1916.
4 SHEETS—SHEET 3.

David Landau INVENTOR.

BY William P. Hammond
ATTORNEY

D. LANDAU.
LAMINATED SPRING.
APPLICATION FILED APR. 20, 1916.
1,199,013.  Patented Sept. 19, 1916.
4 SHEETS—SHEET 4.
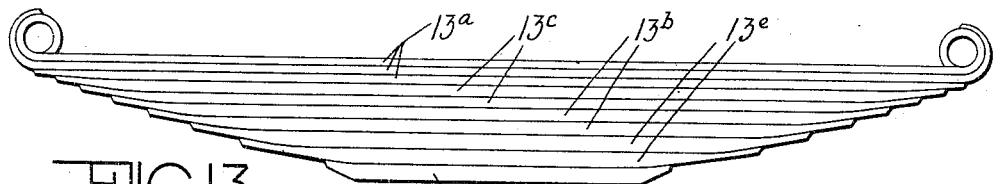
FIG.13
FIG.14
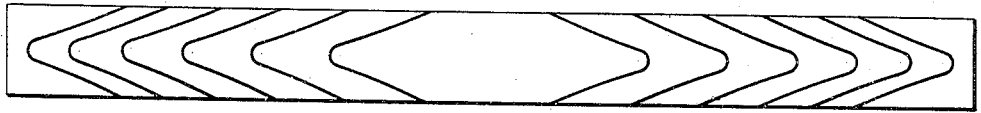
FIG.15  FIG.16
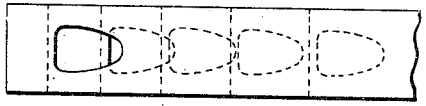 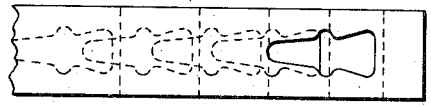
FIG.17  FIG.18
 
FIG.19
FIG.25  FIG.26  FIG.22
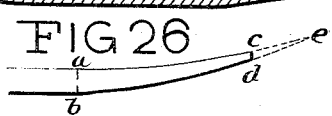
FIG.23
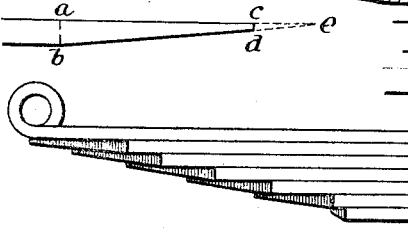
FIG.24
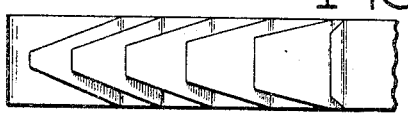
David Landau
INVENTOR.
BY William P Hammond
ATTORNEY

UNITED STATES PATENT OFFICE.

DAVID LANDAU, OF NEW YORK, N. Y.

LAMINATED SPRING.

1,199,013.　　　　Specification of Letters Patent.　　Patented Sept. 19, 1916.

Application filed April 20, 1916. Serial No. 92,446.

*To all whom it may concern:*

Be it known that I, DAVID LANDAU, a citizen of the United States, residing in the borough of Manhattan, city, county, and State of New York, have invented certain new and useful Improvements in Laminated Springs, of which the following is a specification.

This invention relates to improvements in springs of the type built up of superimposed plates or leaves, and which are known as "laminated, plate or leaf springs".

Stated broadly, the objects of the present invention are to produce a spring of this type in which the permissible safe load is greatly increased; the flexibility and resilience enhanced; longer life is secured; ability to withstand stress-reversals considerably augmented; improved lubrication and the exclusion of deleterious foreign substances from between the leaves is obtained; while the stress distribution throughout each individual leaf of the springs is made more regular, and the stress relation of the various laminæ to one another made to approach the highest ratio compatible with the condition of the utilization of all the material of the spring most effectively thereby approaching nearest to the theoretical limit of greatest material economy; to control, besides, the location of the fracture which results from fatigue to such part of the spring and in such a way as to be least disadvantageous, and thereby minimize the disadvantageous consequences that usually result from the rupture of the most important leaf, that is, the master leaf.

A more specific object of my invention is the production of a laminated spring applicable to the conditions presented by the modern high-speed high-powered automobile. While leaf springs have been known for centuries, the automobile has changed conditions to such an extent as to essentially change the character of the spring structure required to meet these conditions. Speed and road conditions are the two principal factors in determining the type and nature of the spring required; for example, farm wagons, while traveling over very rough roads, are quite satisfactory, though provided with no springs at all, owing to the fact that they travel very slowly. Pleasure carriages, which travel somewhat more rapidly and in which the comfort of the occupants is of more importance, require springs, and leaf springs have been developed to a point where they are more or less satisfactory for such moderate conditions, as the speeds are relatively slow, the shocks not excessive and the springs are preferably of considerable flexibility. In the case of railway coaches, on the other hand, very different conditions are met as the speed is very high. The design of the spring, however, is relatively simple as the road-bed consisting of the steel rails, is nearly perfect; consequently, it is unnecessary to provide for a large degree of deflection and very stiff springs are satisfactory. With automobiles, however, the speed of the railway train is reached upon the poor roads which the farm wagon travels. The amount of deflection and violence of the stresses imposed is, therefore, out of all proportion to the like factors in either railway springs or horse-drawn vehicle springs. Moreover, in automobile construction, the very important consideration of reduction of weight of the vehicle, as a whole, and increased endurance, arise. The first automobile springs were nothing but the common carriage or wagon springs and so long as the speed of the automobile was relatively low, such springs after a fashion, answered. With the improvement on the other parts of the automobile, and the resulting increase of speed, the spring problem became much more acute. The attempts to improve automobile springs lay mainly in two directions. Either increased durability and strength was obtained, which was accomplished only at the expense of making the springs heavier, and less resilient, or the springs were made lighter, but only at the cost of durability and safety. In either case the design of the leaf spring retrograded, although, in other respects, the advances in motor car design were most marked. Alloy steels and novel methods of heat treatment have been resorted to, which have resulted in partial spring improvement, but although materials have now reached a high degree of perfection, the springs constructed from such materials have still been found wanting.

I have proceeded along different lines and have found that the mechanics of laminated springs have not heretofore been correctly understood, and that certain important considerations, such as the negative stresses resulting from deflection reversals, and even the very nature of the application of springs to vehicles, has been but little comprehended. My object has, therefore, been in particular to produce a spring of such characteristics as to enable it to satisfactorily meet the very severe requirements of the present-day motor vehicle.

The manner of accomplishing these and other objects of the invention will be manifest from the following description of certain preferred embodiments which are set forth in detail as illustrative thereof.

In the accompanying drawings which form a part of this specification, I have illustrated various forms of springs containing different features of my invention, but for the purpose of clearness, I have made the illustrations diagrammatical in their nature. For the same reason and to facilitate a comparison of their structure, I have illustrated springs, or portions of springs, of the semi-elliptic type (except in one instance), but it will, of course, be understood that my improvements are equally applicable to leaf springs of any type, such as three-quarter elliptic, full elliptic, cantaliver, platform, etc., or, in fact, any relation or combination of the elements in which multiple leaf springs may be combined and employed.

Figure 12:
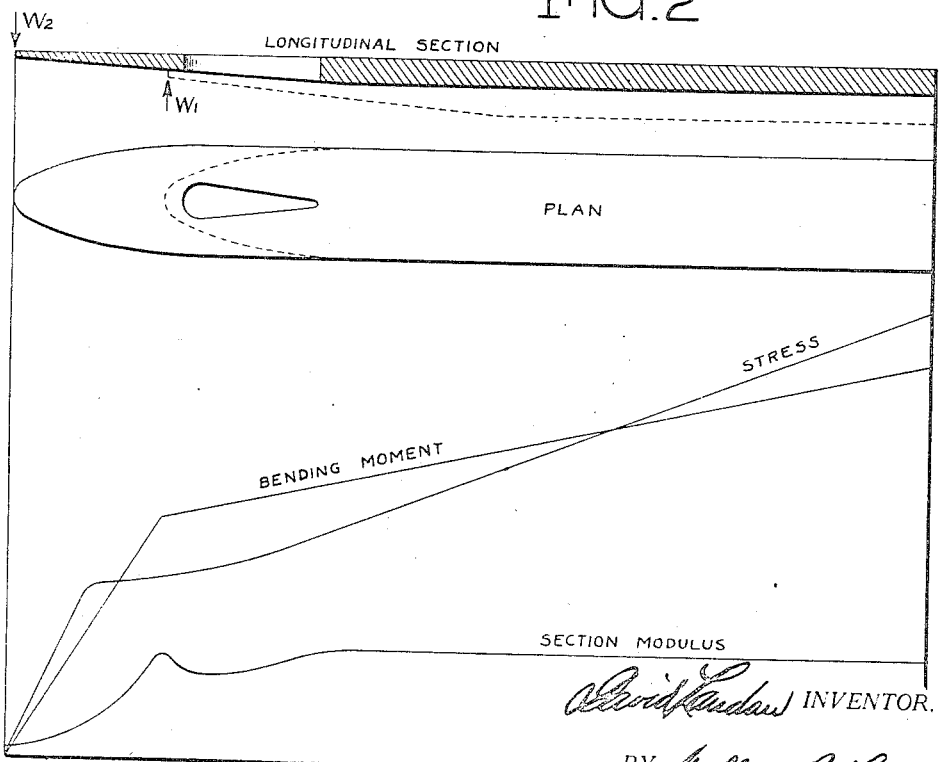
Figure 7:
Figure 8:
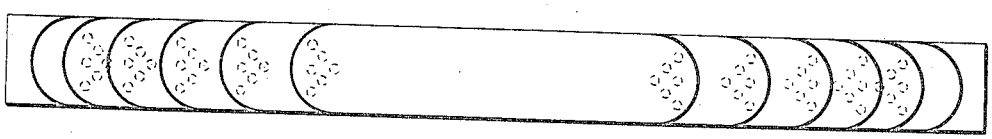
Figure 9:
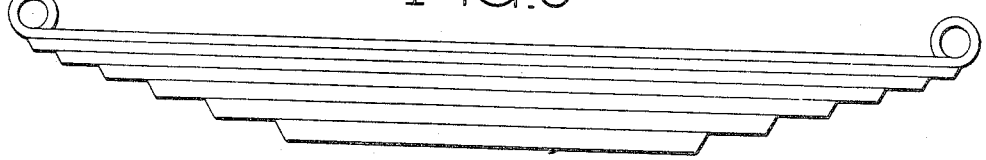
Figure 10:
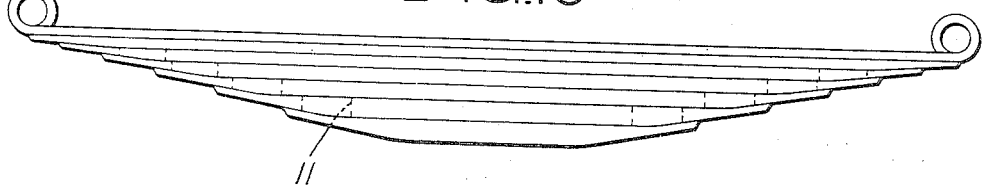
Figure 11:

In these drawings, Figure 1 is a diagrammatic side elevation of a conventional or orthodox spring as constructed prior to my invention. Fig. 2 is a series of curves showing the variation in bending moment, section modulus and stress in one of the intermediate leaves of the conventional spring, such as that illustrated in Fig. 1. Figs. 3 and 4 are diagrammatic side elevational and plan views, respectively, of a spring having the ends of the leaves tapered in thickness, the taper of each lower leaf overlapping the base of the taper of the leaf above and the length of the step or overlap decreasing from the short to the long leaves. This construction embodies certain features of and secures some of the advantages of my invention. Figs. 5 and 6 are diagrammatic side elevational and plan views, respectively, of another form of spring embodying some of the features of my invention, this spring differing from the spring shown in Figs. 3 and 4, by the fact that the ends of the leaves are tapered in width instead of in thickness. Figs. 7 and 8 are diagrammatical vertical sectional and plan views, respectively, of a spring embodying a modified form of my invention in which zones adjacent to the ends of the leaves are reduced in section by having metal deleted therefrom in the form of a plurality of perforations. Fig. 9 is a diagrammatic side elevation of a spring embodying another feature of my invention, in which the leaves are graded in thickness from the short plate to the master leaf, the short plate being the thickest while the master leaf is the thinnest member. Figs. 10 and 11 are diagrammatic side elevational and plan views, respectively, of a spring embodying my invention in more elaborate form, this spring having the leaves graded in thickness from a thick short plate to a thin master leaf, the steps or amount of overhang between the ends of the leaves decreasing from the short plate to the long plate, the ends of the leaves being tapered in width and thickness and the tapers overlapping and the intermediate plates of the spring have the stress-rectifying slots formed therein. Fig. 12 is a plot of the curves showing the variations of the bending moment, section modulus and stress for one of the intermediate plates of a spring such as that illustrated in Figs. 10 and 11. Fig. 13 is a diagrammatic side elevation of a spring embodying features of my invention, showing the use of a master leaf constructed of a plurality of thin plates and showing the plates increasing in thickness from the master leaf to the short plate, such increase not, however, being uniform and several of the intermediate plates being of the same thickness. Fig. 14 is a diagrammatic plan view of a spring showing a modified form of overlapping taper which may be employed in carrying out my invention. Figs. 15 and 16 are fragmentary diagrammatic plan views of springs with the master leaves removed, showing different forms of stress rectifying slots, which may be employed. Figs. 17 and 18 are similar views showing arrangements of stress rectifying perforations. Fig. 19 is a vertical sectional view of a three-quarter elliptic spring embodying stress rectifying slots which are utilized also as means for lubricating the spring leaves. Figs. 20 and 21 are fragmentary sectional and plan views, respectively, of a spring having stress rectifying perforations therein of a shape particularly adapting them to the distribution of lubricant between the leaves, these figures also illustrating the construction of shackle bolt adapted to supply lubricant to the spring. Fig. 22 is a diagrammatic side elevation of a spring in which all of the leaves are of the same thickness except the master leaf which is thinner, the steps or overhangs being shown unequal and the individual leaves being formed with stress rectifying slots. Fig. 23 is a diagrammatic side elevation of a spring in which the tapers are trapezoidal in width and thickness, and Fig. 24 is a bottom plan view of Fig. 23. Fig. 25 is a diagrammatic view showing the end of a spring leaf having a form of taper of my invention. Fig. 26 is a similar view showing the leaf end curved.

It will be understood that my invention may be embodied in a great variety of forms other than those shown, which are selected merely for purposes of illustration.

Leaf springs, as heretofore constructed, have been open to serious objections in that the stresses have not been even approximately uniformly distributed throughout the various leaves and parts thereof in such a way as to secure the longest life of the spring or the greatest strength from the metal employed. Certain portions of the springs have been stressed more than others, resulting in their early fatigue and fracture; this was owing to the intense localization of stress in the center of the leaves weakening them before the spring as a whole had reached anywhere near the limit of its strength and endurance, all of which was produced by a defective interaction of the various elements of the spring which prevented the separate leaf elements from functioning in the highest possible degree as a unitary structure. This resulted in more of the work being borne by some parts of the spring than was desirable and militated against the several leaves of the spring maintaining at all times a close bearing contact necessary to secure satisfactory lubrication; in fact, in many cases, the leaves of such springs tended to separate under certain conditions causing what is known as "gaping," or spaces between the leaves being thereby presented into which dirt and water entered causing rusting and abrasion and consequent unsatisfactory operation and shortening of the life of the spring.

It has, of course, long been the aim of spring makers to secure the design of a leaf spring for the maximum efficiency of material employed in its construction, but hitherto the supposed theoretic case complying with the mentioned requirements was thought to be produced by using a series of leaves of equal width and thickness with overhangs or steps, all equal, as illustrated, for example, in Fig. 1. I have found by experiment that, on the contrary, a spring built in this manner is extremely inefficient as the individual leaves do not carry equal loads, which the theoretical assumptions suggest. In a spring made in this manner I find that the pressures act only at the very end of each lamina. The mutual action or pressure between the end of one lamina and the adjacent longer one, I shall call hereinafter the "reaction." These reactions are localized at the very tips of the lamina, and owing to such localization, the reactions are found to be different for each lamina. And because each leaf is subjected to a different pressure, the stress is not the same in any two laminæ, and varies even in the same lamina at different points throughout its length. Theoretical investigations confirm these views, but I state them here as I have verified the matter by exhaustive experiment. As an instance of the correctness of my investigations, I may say that, if by experiment we find that on taking a single plate and determining its safe load then, it will be found that a spring of two such plates with equal stepping will not carry, with equal safety, double the established load for one plate, but only one and three-fifths times the experimentally-fixed load for the one plate, or even less. In a ten plate spring of the same kind, for instance, the safe load does not become ten times as great as that of the single plate, which the present day theoretical analysis leads us to infer, but as I have discovered, only six and one-half times, or even less. From this it appears that the reactions in the instances noted are greater in value than the load on the master leaf, and therefore, increase toward the shorter leaves.

Fig. 1 of the drawings shows diagrammatically a conventional form of spring which is open to some or all of the objections noted. This figure is intended to illustrate a spring of the semi-elliptic type which may be described briefly as comprising the master leaf 1ª, long plate 1ᵇ, intermediate plates 1ᶜ and short plate 1ᵈ. The several plates are secured together at the center by the center bolt 2, the spring being supported on a suitable seat or perch 3, which may be made to form a part of a vehicle axle 4. Such springs are secured to their seats in various ways, the most common being by means of box clips or bolts 5. The load is supported in the first instance by the master leaf, which is provided at its ends with the eyes 6 which receive the shackle bolts. The master leaf, in such a spring, may or may not be attached to one or more of the adjacent plates by means of re-bound clips, such, for example, as indicated at 7. As will be seen, each plate is longer than the one below it, the projecting part of the plate above indicated by the dimensions 8 being the "overhang" or "step". In the spring illustrated the overhangs or steps are equal for all of the intermediate leaves, as is customary in springs of this character. The end portions or points of the leaves are also shown as slightly tapered, as indicated at 9, but the tapers of the leaves above terminate at or outside of the ends of the leaves below. In other words, the ends of the leaves below do not overlap the bases of the tapers of the leaves above. In the spring illustrated in this figure, all of the plates, including the master leaf, are of the same thickness, this being a common construction, although in many springs as now built, this arrangement is departed from by "grading" the leaves in thickness, the short plate being thinner and the master leaf thicker. In a spring of the character described the distribution of stress is very far from uniform, both in each leaf and in the spring as a whole, resulting in the inefficient use of the metal of the spring. The stress distribution in one of the intermediate plates of a spring of this character is illustrated by Fig. 2. Reference to the stress curve in this diagram shows that the stress in the tapered end of the leaf starts from zero, rises more or less rapidly and then falls abruptly to a low value, as indicated by the point $y$ on the curve; it then rises continuously reaching a maximum at the point of support or seat of the spring. The point $y$ corresponds generally to that part of the leaf immediately over and within that part supported by the end portion of the leaf below. It will be seen from this that the metal of the plate in the region of low stress $y$ is not doing the work the rest of the plate is called upon to do; hence this part of the plate is inefficiently utilized. Similar conditions to that indicated exist in all of the intermediate leaves of the spring which results in a very unequal and faulty stress distribution throughout the spring as a whole, and consequently in a substantial loss in efficiency. It is also true that in springs of this character, the master leaf is subjected to greater ranges of deflection, and hence is usually stressed more intensely than any of the other leaves, which results in its being the first to break under excessive strains and the first to fatigue under continued use. This result is further promoted by the fact that the master leaf to which the load is applied is subject to frequent and greater deflection reversal stresses due to the rebound of the spring than any other plate comprising the spring.

As the master leaf is the element of the spring which primarily supports the load, this is a very objectionable feature, as, if it ruptures first, it will necessarily deprive the spring of any supporting capability.

As stated, it is the object of the present invention to overcome many of the defects of prior constructions and particularly to secure a more satisfactory distribution of the stresses throughout the separate leaves of the spring and a more satisfactory stress relation among the various leaves thereof. The means which may be employed for these purposes are various. Referring now to Figs. 3 and 4 I have found that by properly tapering the ends of the laminæ the reactions of the "leaves below" the master leaf may be increased. When a spring is made, for example, with leaves of equal thicknesses and equal overhangs, and the step portions are tapered, so that the overhanging part is of such a shape that it follows the well-understood law of a beam of uniform strength, then the reactions among the leaves are made equal. If such tapers be made more flexible in the overhangs than indicated above, the pressures or reactions will keep rising from the short leaf to the top plates with a result that the safe permissible load is increased, for it can be shown that the permissible load is always directly proportional to the reactions, and is equal to the final reaction. Also as the pressures may be made practically, or, as near as we please, equal it follows that the resulting stresses in each leaf can be made as near as we like the same for all. This increases the efficiency of each lamina and consequently the spring taken as a whole. And, most generally, the more flexible the taper, the greater the efficiency.

In the second place, I have found that a very decided change in the reactions among the plates takes place if the steps are made unequal. This is quite the contrary to the present prevailing practice where such stepping is made equal. By making the steps or overhangs gradually shorter from the short plate to the longest plate it is possible to increase the progressive reactions from the short plate to the last or longest plate, thus making the reactions equal to one another or even greater in the longer plates instead of less, as in the common construction. This increase of the reactions allows a more uniform pressure to obtain in the plates, and enables the spring to carry, with equal safety, greater loads. Therefore, such a spring is quite efficient in respect to the fact that its main leaf is given a greater support by the shorter leaves, which extend out farther toward the end of the spring and thereby decrease the stress in the longer plates. And as each shorter plate relieves the plate above it, the longest plate, or main leaf, is thus mostly relieved by the joint actions of all the succeeding plates acting mutually to produce the sought result.

Referring now to Figs. 3 and 4, I have shown in these figures an example of an improved spring in which the ends of all of the plates except the master leaf are tapered, the tapered end of each leaf below overlapping the base of the taper of the leaf above. Also the steps between the ends of the leaves and the amount of overhang of each leaf increases from the long plate to the short plate. It will be seen at once that a material improvement has been made in the spring by these changes. Such improvement results, however, not only from the increased reactions of the lower plates which produces a better stress distribution among the several plates, but also results from a more uniform distribution of the stress throughout the metal of each individual plate.

As pointed out above, in the conventional spring there is a point of very low stress in each of the intermediate leaves in the region immediately over the end portion of the leaf below. In other words, the metal in that zone is used inefficiently and this part of the spring leaf is under-stressed resulting in throwing higher relative stresses upon the central portions of the leaves. In the construction shown in Figs. 3 and 4, however, where the taper of the leaf above extends beyond the end of the leaf below so as to be overlapped thereby, there the section modulus of the leaf has been reduced in the zone adjacent to where the leaf above is overlapped by the leaf below; that is to say, at the same point corresponding to the location or area of low stress of the orthodox spring. The reduction of the section modulus at this point obviously will result in an increase of the stress in this portion of the plate and, therefore, a more uniform distribution of the stress throughout the plate. The increase in the flexibility of each leaf produced by thus carrying back the tapers also (or by deleting metal, as will be hereinafter described) results in the increased flexibility of such spring and greater equalization of pressure among the leaves, which, in turn, permits greater safe load on the spring.

In Figs. 5 and 6 I have illustrated another form of spring which secures, in general, results similar to those obtained by the form of spring shown in Figs. 3 and 4. As shown in Figs. 5 and 6, the ends of the leaves are tapered in width instead of thickness, the end of each leaf below overlapping the base of the taper of the leaf above, the length of the step or overhang at the same time decreasing from the short plate to the long plate. These figures also show the length of the taper or its "fineness" increasing from the short plate to the long plate, a feature of considerable importance which will be discussed more in detail hereinafter.

Referring now to Figs. 7 and 8 I have shown another construction for improving the stress distribution in the spring. According to this construction, the intermediate leaves of the spring have portions of the metal deleted in the regions of tendency to least stress, the metal deletion in the present instance taking the form of perforations 10. As explained above, these regions of least stress in the conventional spring are in the portions of the leaves adjacent to the steps or where the leaves above are supported by the ends of the leaves below. The perforations are, therefore, located in these zones. It will be understood, of course, that the perforations may be made wherever in the particular spring, regions of low stress would otherwise occur. The perforations, obviously, reduce the section modulus of the leaves at these points, thereby securing a more uniform distribution of the stresses as already indicated.

As pointed out above, another direction in which many springs of the prior art have been imperfect is that relative proportional distribution of the stresses among the leaves has been such that these resultant stresses were greatest in the master leaf. This has resulted in the breakage of the master leaf first, which is undesirable for reasons given. Instead of the master leaf breaking first, it is much more desirable to have the spring so constructed that one or more of the shorter plates will break first, the master leaf being preferably the last to rupture. In order to obtain this desideratum, it is necessary for the stress distribution among the leaves to be such that the stresses are least in the master leaf and greatest in the short or shorter plates. In Fig. 9 I have shown one construction by which this result may be obtained. As here illustrated, the plates are graded in thickness from the short plate to the master leaf, the latter being the thinnest, while the short plate is the thickest. It is a well known law of mechanics that the intensity of stress in a bar varies, for equal deflections, as the square of the distance of the extreme fiber from the neutral axis. Therefore, it will be seen that the reduction in thickness of the master leaf and the long plates rapidly reduces the stress therein, which is the result sought. Furthermore, this reduction in the thickness in the long plates by increasing the flexibility thereof has an effect somewhat analogous to that of tapering and metal deletion, as already described, and tends to equalize the reactions among the plates.

The springs illustrated in Figs. 3 to 9 inclusive, while possessing in some degree various of the advantages of my invention, are to be regarded as exemplifications of the use of sundry structural characteristics which may be employed singly, but some or all of which are preferably combined to produce a structure possessing in the highest degree the advantages of my invention. By effecting such combinations, I am enabled to produce a spring having almost any desired stress distribution and suited to any particular condition which may obtain and one in which the material is utilized in a far more efficient manner than in any springs as heretofore constructed.

In Figs. 10 and 11 I have shown a spring illustrating one way in which the several features may be combined with most advantageous results. In the spring shown in these figures it will be seen that the leaves are graded in thickness from the short plate to the master plate, the former being the thickest and the latter the thinnest. The plates are also graduated in length so as to produce steps or overhangs decreasing from the short plate to the long plate. The ends of the plates are also tapered in thickness and in width, the former taper being illustrated as of trapezoidal shape while the latter taper is of generally parabolic shape, as shown in Fig. 11. The tapers are so proportioned that the end of each leaf below overlaps the base of the taper of the leaf above, while the length or "fineness" of the tapers increases from the shorter to the longer leaves. Also the intermediate plates are provided with stress rectifying slots 11 which are located at regions where the stress would otherwise tend to be the least, to-wit: in the portions of the leaves which are supported and covered by the ends of the adjacent leaves below. A spring constructed as shown in these figures, possesses, in a marked degree, the advantages which I claim for my invention. The stresses are distributed in such a way as to utilize the metal in the spring most efficiently and the stress allotment among the leaves is such that the resultant intensity of stress is greatest in the short plate and decreases in any desired degree throughout the plates to the master leaf where the combined resultant stress is always lowest. As a result of this apportioning of the stresses the short plate of this spring will break first, if the spring be subjected to, for example, excessive distortion, or when fatigue is reached. The breakage of the other plates will follow, more or less, as desired, in successive order from the shorter plates to the master leaf in which the stress intensity is least, and which as a consequence is last to break under conditions of excessive stress or fatigue. And by reason of its low condition of stress, the master leaf is able to withstand the stress reversals to which this leaf is peculiarly subject.

In order to make clear the principles underlying the use of the several structural features which I have referred to and to show how such features may be combined and when so combined modify the action of each other and unite in producing such stress distribution as may be desired to suit any particular case, I will now set forth in somewhat more detail the results produced by the introduction and combination of these features.

As I have already stated, decreasing the steps or overhangs from the shorter plates toward the longer plates increases the reactions among the plates, and therefore, increases the proportion of the work done by the several plates. This results in "working" the material of the spring more efficiently and increases the permissible safe load which the spring will carry. If, however, advantage is to be taken of this greater strength of the spring, it is to be assumed that the spring will be subjected to greater loads which, in turn, will increase the stresses in the master leaf and longer plates, which increase may reach a point, causing the master leaf to break first, which is objectionable as has already been set forth. In order to overcome the effect of these growing reactions in producing abnormal stresses in the longer leaves, a second of the structural features described may be introduced, namely, the inversion of the steel sections, using the thinner plates on top and thicker ones at the bottom, and tapering the end portions of the leaves. These tapers, as explained, are preferably made longer than the amount of the overhang of the leaf below so that the tapers themselves overlap as described. Also the length or the "fineness" of the tapers is preferably increased from the shorter to the longer leaves. This combination of the increased length of leaves and tapers, and the correspondingly smaller flexural rigidity of each leaf causes the reactions to increase and tends to become a maximum at the main plate. It can also be seen that the gradually growing tapers extending, as they do, toward the end of the spring, tend to give a lesser support, so to speak, to the master leaf, and longer plates. There are then several effects produced jointly by this construction of tapered leaves. First, deflection takes place more toward the ends of the springs than at the center, and, indeed, the deflection is thus more uniform along the entire length of the longer plates, which deflection tends to become greater toward the end of the spring. The increased bending of the upper leaves in turn tends also to increase the stress therein, although such stress is more uniformly distributed throughout the length of the longer plates and relatively somewhat less in the shorter plates. The form of the tapers used is not essential so long as the desired flexibility of the end portions of the leaves is secured, but certain forms of tapers are more effective in this regard than others. For example, tapers in thickness increase flexibility in a much more pronounced manner than tapers in width. This is apparent from the fact that flexibility varies with the cube of the thickness of a beam, but only as the first power of the width. I, therefore, in most, if not all cases, taper the leaves in thickness, this tapering in thickness being accompanied, or not, as desired, by a tapering also in width. A very satisfactory form of taper is shown in Figs. 10 and 11 in which the leaves are shown tapered in the plane of the thickness so as to produce a leaf end of trapezoidal cross section, while the leaf end is tapered in the width in a parabolic form. This combination form of taper I find to give the highest efficiency compatible with a due regard to problems of manufacture.

I have used the expression "trapezoidal" with relation to my taper as having the outline of a trapezoid, in various places in this specification and in the following claims as a convenient way of expressing a characteristically-novel form of taper which I have invented, rather than as a precise geometrically-descriptive term. I have used this expression because this taper, in its elemental form may be considered as bounded by converging plane surfaces, but which, however, is usually not extended to the actual line or point of intersection of the surfaces. Theoretically, the taper might be extended to such an edge or point, but I prefer to cut off the extreme edge or apex which is not useful and which is impracticable to manufacture commercially. Considering the taper in this elemental form it will, therefore, be seen that it has generally the outlines of a trapezoid bounded by lines lying in the converging upper and lower surfaces of the taper and by lines lying in the end of the taper and at the base thereof, respectively. I do not use the term, however, in a strict or limited sense as, for example, in many, if not most cases, the tapered portion of the leaf is curved as a whole so that the upper and lower surfaces thereof are curved or cylindrical rather than plane surfaces. The thickness relation, however, remains the same, and such a taper might be described as one in which the thickness at any point is a linear function of the distance of that point from the base of the taper. Thus in Fig. 25 I have shown diagrammatically a portion of a leaf spring provided with a taper of this character in which the tapered portion has the section of a trapezoid $a\ b\ c\ d$. The taper, obviously, might be continued out to a point $e$, as shown in dotted lines. Fig. 26 shows the leaf provided with the same taper curved, as is usually done in practice, the characteristic form of the taper being, however, retained, in that the same thickness relationship exists. Such a taper is, of course, included under the term "taper of trapezoidal section" or "trapezoidal taper" as I have defined those expressions. This taper differs materially in degree of flexibility from a taper, such as illustrated in Figs. 1 and 2, which, when developed so that its upper surface is plane, has its lower surface defined by a convex curve. Thus it is seen that tapering a leaf increases its deflection and makes the resulting stress therein more uniform; this condition applying to a beam fixed at one end and loaded at the other, which is the mode of action of a leaf in a leaf spring, as I have explained. Hence, the more we taper, and by this I mean, in the length and in kind, the greater the efficiency and the resilience. The increased tapers, however, as pointed out, react to continually increase the stress in the longer leaves, and, as in the conventional spring, the longer leaves are usually as thick as, or, more often, thicker than the shorter leaves, it follows that the stresses become greater in the longer plates. And, since the longest and thickest plate is usually the master leaf, it follows from what has been said that increasing the taper and hence the efficiency of the shorter leaves, results in imposing greater stresses in the longer plates. Hence my system of tapering, which increases remarkably the efficiency of the spring, if used in a spring graded in the orthodox manner, decreases the efficiency of the most important plate, namely, the master leaf. To have the master leaf subject to first failure, is often dangerous and decidedly undesirable. In my present spring, I have overcome this disadvantage without in any manner sacrificing the efficiency of the effect of long and overlapping tapers. I simply proceeded in the following fashion based on well-understood mechanical principles.

It is an old established law of mechanics that a beam of thinner section is more flexible than a beam of thicker section and that for like deflections, the extreme fiber stress will be less in the thinner section. It is also true that a thick sectioned beam may be made as flexible as a thinner beam by tapering the thicker beam in any one of the several well-known ways. I therefore make, as pointed out, the shorter plates of heavy sectioned material and taper these in the several ways indicated. I then place thinner laminations above these thicker ones, thus in effect, completing the spring by using the thinnest lamina at the top. And while the reactions are thus still tending to increase, the plates of thinner and more flexible section receive the support of the thicker and shorter plates. But the thinner plates, and usually the thinnest of all, which is the master leaf, and which is not tapered for reasons that are self-evident, can bend with equal ease, as the thicker tapered and shorter plates. But the shortest plate having the greatest unsupported overhang is thereby, at will, in the design liable to break first, although the efficiency of the whole spring has been greatly augmented by considerations just indicated. I am thus able to secure in practice the greatest efficiency of the spring for reasons now made clear, without in any manner sacrificing early rupture of the master leaf. I have combined, as well, in this construction the other elements, as that of unequal stepping, for the purposes of increasing the safe permissible load on the spring. It remains to indicate why more or less of this inverted spring grading is used in one spring than in another. And by "more" or "less" as applied to grading, it is to be understood that I mean the relative number of different sectional thicknesses of material employed in any one spring. The physics of this construction will now be detailed more fully so as to make clear why sometimes one amount, and sometimes another amount of grading is preferably used.

Consider the nature of the forces locked up in a plate spring, and it will be seen that there is always a negative stress in the longer plates, due to the mode of manufacturing such springs. As the various plates are of different curvatures, when the spring plates are free, that is, before they are assembled, it follows, as can be seen on examination of any leaf spring, that when a combination of such leaves is assembled, there is an internal stress locked up in the several leaves before the spring is subjected to an external loading. These internal stresses always result in producing negative stresses in the master leaf. Now, when a sufficient load is placed on the spring, there comes a time when such external load reverses the stress in the master leaf until the stress therein eventually becomes positive. And further, if a spring is caused to rebound, the master leaf—and sometimes other plates that are clipped to it as shown in Fig. 1,—all undergo a reversal of stress. It is a well known principle that it is the "range" of stress variation which produces early destruction, rather than the maximum stress reached, and, therefore, it is the master leaf and long plates in which the "range" is greatest due to the stress reversals and which are most severely worked. I make these plates for this reason, as well as others, thinner, so as to accord them favor for this stress reversal condition. Evidently a thinner plate can reverse the same distance as a thicker one without incurring as high a stress, or as great a range of stress variation therein. But I have pointed out besides that the load stress, that is to say, the downward action on the master leaf, is also considerably less in my type of inversely graded spring. It follows then that my spring structure can thus undergo considerably larger reversal deflection without breaking the master leaf than in the orthodox springs.

We have now shown how the stress varies from leaf to leaf and that the present invention adjusts these large variations to an appropriate and corrected practical and theoretical requirement, at the same time bringing these stresses as near as desired to a given or fixed condition. Also it has been made clear how the stress in each leaf is made very nearly uniform. But, as the matter stands, a defect still exists which we have seen in the diagram (Fig. 2) where there are shown to exist cusps or reëntrant angles in the stress curve. To remove these reëntrant angles without materially increasing the flexibility of the leaves as a whole, and without further increasing the reactions, and thereby undoing the advantage gained by the highest efficiency of the construction as outlined, I have introduced the important feature of my invention consisting in the formation of what I have termed "the stress-equalizing slot." This feature of improvement will now be explained as to its mechanical relations and organic function.

If, in Fig. 2 for example, we should carry the taper still farther inward on the lower plate, we would reach a point where the reaction denoted by $W_2$ would become much higher until the plate in question would sustain the load $W_2$ without relative appreciable support from the plate below till, in the limit, the second or top plate stress would be equal to and finally greater than the stress in the plate below. This increase of the reactions would go on until each succeeding upper plate would carry an ever increasing load producing an increasing strain, resulting, in the limiting case, of making the main leaf carry the greatest burden and without its receiving any appreciable support and hence failing first. This is undeniably objectionable, and would vitiate the very results which I seek. To remove therefore the cusp in the stress curve it follows that we cannot taper the plate any more, for so doing would only increase the reactions and push the cusp location back farther into the leaf. I have, therefore, instead devised the simpler and far more practical solution of this difficulty and proceeded as follows:—I remove the metal in the width of the leaf locally as shown in Figs. 10 and 11, or in the enlarged view of Fig. 12. For as the deflection is much less affected by removing the material in the width than in the thickness, clearly, we can remove considerable material in width without appreciably affecting the deflection whereas if we remove the same amount of material in thickness, as by increased length of tapering the change in the deflection and the increase of the resulting reaction would rise quite rapidly and out of all desirable proportion. Hence this metal deletion, resulting in a reduced section modulus locally, increases the stress at a point which I make adjacent to and in the zone of the area covered by the point of support of the leaf above and by the adjacent shorter leaf. There is thus a tendency to an increased stress, or rather, to making the stress uniform, or as near as we please, equalize the stress in such leaf and in every leaf, and hence in the whole spring. The zone of deletion is quite important and such zone, as just pointed out, is always adjacent to the point where the given leaf is supported by the adjacent shorter leaf, and within the area covered by the two neighboring leaves.

The effect produced by the stress rectifying slots 11, or their equivalents, is apparent from reference to Fig. 12. This figure shows, among other things, a stress curve of one of the slotted intermediate plates of the spring shown in Figs. 10 and 11. It will be seen that the formation of the slot in a portion of the plate which lies adjacent to the supporting end portion of the plate below and covered by a plate above, produces a reduction in the section modulus in this region, which, of course, increases the flexibility of the plate at that point and in turn results in a local increase of the intensity of stress. Comparing the chart shown in Fig. 12 with the chart shown in Fig. 2 it will be at once apparent what the effect of deleting the metal has been. It has substantially eliminated the region of low stress, $y$, and has made the stress in the plate much more uniform. The result of this is to make the part of the plate where the metal was formerly working inefficiently do its quota of work, and accordingly increases the efficiency of each of the plates and of the whole spring. It will be seen that the stress curve in Fig. 12 has no such deep reëntrant portion as that shown in Fig. 2.

It is to be understood that the form of stress rectifying slot shown in Figs. 11 and 12 is merely illustrative of the manner in which the desired result above indicated may be secured. A number of perforations may be employed instead of a single slot as shown in Figs. 7 and 8, or different forms of slots may be utilized such as illustrated in Figs. 15 and 16. Other arrangements of the perforations from that shown in Figs. 7 and 8 are illustrated in Figs. 17, 18 and 21. In fact, any arrangement of perforations or form of cutout may be employed which will produce the desired stress distribution under the particular conditions to be met with. Indeed the section of the metal may be changed without cutting openings as illustrated and other constructions may be employed which properly increase the flexibility of the end portions of the leaves and produce some of the same results which are produced by the slots or perforations. This removal of the metal of the leaves in certain regions so as to increase the reactions between the leaves and equalize or rectify the stress in each leaf can best be generically described in terms of the section modulus which represents the resistant power of the leaf at the given region. Thus if it be stated that the section modulus of the leaf is reduced at a certain point, this will indicate the weakening of the leaf at that point, either locally decreasing its width or thickness, or by removing or redistributing the metal in any other way.

It will be further comprehended that various modifications may be made in the proportioning and grouping of the leaves. For example, while I have referred to the use of leaves graded in thickness from a thick short leaf to a thin master leaf, it will be understood that the graduation of the leaves need not be uniform. For example, as shown, in Fig. 22, all of the leaves may be of equal thickness excepting the master leaf which is thinner. In this way the master leaf is subjected to a lower stress than the other leaves and is thereby enabled to better withstand extremes of deflection and long usage and also the slight reversal stresses to which it may be subjected. Where considerable reversals of stress occur, however, as in the case of high-speed motor cars, I prefer the "many gradings," as indicated in Figs. 9, 10 and 11, as that procedure makes the top or main leaf still thinner relatively to the shortest plate, and such a spring can therefore withstand much higher stress reversals or ranges. And it is clear that there are any number of combinations and permutations possible for the several cases which may arise in practice, which are fully within the scope of my invention, where I seek to have on the one hand an inverted graded spring in which only the main plate is thinner, the rest being all of the same thickness, and, on the other hand, a spring whose main plate is the thinnest followed by a series of other plates gradually increasing in thickness, and whose short plate is the thickest.

One such possible arrangement of the leaves is to have a thick short plate and a thin master leaf or leaves, the intermediate plates, instead of being uniformly graded, being of the same thickness, or some of the plates may be graded in thickness while two or more successive plates may be of the same thickness. Such arrangement is shown in Fig. 13 in which the intermediate plates $13^c$ are shown as of the same thickness and thinner than the short plate $13^d$, as are also each of the series $13^b$ and $13^c$. This figure also shows the intermediate plates tapered, while the short plate $13^d$ is not tapered, or at least but very little; this increases its rigidity and therefore increases the stress therein and its liability to be the first to break. I have also shown in this figure a master leaf $13^a$ made up of a plurality of thin plates producing in this way a master leaf of great flexibility and one which is enabled to withstand very severe reversal stresses.

Various forms of tapers other than the simple trapezoidal, parabolic and triangular tapers already described may be used. For example, the elongated or cusp-like tapers shown in Figs. 14 and 18 may be employed in some instances to produce the desired variations in reaction and section modulus variation at the end of the leaf.

As an incidental function of the stress rectifying perforations or slots, I have found that these openings may be employed very advantageously as containers and distributers of lubricant between the leaves of the springs. By filling such openings with lubricant of solid or semi-solid form a sufficient quantity of it can be retained in the spring to keep the same in a satisfactorily lubricated condition for a very long time. It is possible also in some cases to employ oil as a lubricant in connection with these openings in which case the oil will gradually work through the openings from leaf to leaf and so lubricate the entire spring. In the latter case an opening may be provided in the top of the spring into which oil may be injected at intervals so as to replenish the supply. I have shown a construction for this purpose in Fig. 19. As here shown the master leaf of the lower member of the spring is provided at its ends, or in the eye, with openings 15 into which oil may be poured which will work through the perforations 10 and maintain the entire spring in a well-lubricated condition. For supplying lubricant to the upper or inverted member of the spring, the short upper leaf of the latter is provided with a cup 16 into which oil may be poured or which may be filled with a pad of absorbent material saturated with oil which works down through the perforations in the leaves. If desired, the oil or grease may be supplied through the shackle bolt as shown in Figs. 20 and 21, the shackle bolt 17 in this instance being provided with a channel 18 through which the lubricant is fed from the grease cup 19. Oil or grease passes down through a channel 20 formed at the bottom of the eye and works down between the leaves through the perforations 21. I have shown in Fig. 20 a form of perforation having chamfered ends, which construction I find facilitates the transmission of the lubricant from leaf to leaf by acting as a pump through a sort of scraping action.

As illustrative of the application of my invention to a particular case, I will give the dimensions of a front spring which I have designed for a high-speed high-powered motor car. This spring is a semi-elliptic spring of the eccentricated type, that is to say, it projects more on one side of the support than the other, the extreme length of its longer end from the center support being 22 1/8" and of the shorter end being 16 15/16". The spring is composed of nine leaves 2" wide and of thicknesses as follows: main leaf 7/32 of an inch; the following four leaves 1/4 of an inch and the last four leaves each 9/32". The steps or overhangs are unequal, the short plate being 15" long and projecting 8 1/2" from the center of support on its longer end and 6 1/2" on its shorter end. The overhangs of the succeeding plates at the long end are as follows: 2 15/16"; 2 5/8"; 2 7/16"; 2 1/16"; 1 15/16"; 1 5/16" and 5/16 of an inch; and at the short end the corresponding overhangs are 2 1/4", 2", 1 7/8", 1 9/16", 1 1/2", 1", 1/4". The plate next to the master leaf is wrapped halfway around the eye, as illustrated in Fig. 13. The tapers beginning with the short plate are as follows: long end of spring 5 1/4" and increasing by 3/32 of an inch for each leaf up to the wrapper. At the short end of the spring the short plate is tapered 4" each succeeding leaf up to the wrapper being tapered 1/16 of an inch more than the leaf below. Stress-equalizing slots of the general type of those illustrated in Fig. 11 are formed in each end of each of the intermediate plates. The outer ends of these slots at the long end of the spring lie 21/64 of an inch inside of the point of the leaf below and at the short end of the spring, the outer ends of such slots lie 1/4 of an inch inside of the end of the point of the leaf below. The tapers are trapezoidal in thickness and parabolic in width, of the general type illustrated in Figs. 9, 10, and 11. This spring is designed to carry a safe load of 850 lbs. and will stand violent rebound without breaking its main leaf first. The spring described represents an actual case which has been used commercially to a considerable extent and which has performed in a highly satisfactory manner.

From the foregoing it will be seen that the fundamental idea of my invention consists in the effort to produce a uniform distribution of the stresses and increasing reactions throughout the several elements of a leaf spring and in the spring as a whole in such a way as to enable the spring to perform its intended work in the most efficient manner, and that various structural expedients may be resorted to in the attainment of this object. Primarily a leaf spring is designed to carry a given load and to provide for a certain maximum deflection without stressing the metal of any part of the spring beyond a safe value. Stress limitations are fixed by the elastic strength of the material and also by its qualities of resistance to fatigue under repeated varying stresses.

As some parts of the spring at least undergo repeated reversals of direction of stress, it is manifestly of advantage that the spring be so constructed as to carry the required load and permit of the required deflection and reflection (contra-wise deflection) without making the spring of any greater dimensions or using any more metal than is theoretically necessary. By so doing the dimensions of the spring are reduced to the lowest limits while its weight is also kept at the theoretical minimum with the result of a saving in material which is an advantage in itself as it decreases the cost; it also results indirectly in a saving in total weight of the vehicle of which (in this particular application) it may form a part. To accomplish this result, it is clear that there must be such an even distribution of the stress throughout the spring as to make every part of it do its proportionate share of the work and thereby eliminate dead material. This result could be theoretically accomplished by making the stress in every leaf of the spring exactly proportioned to the work to be performed by it so that the intensity of stress would everywhere in the leaf be the same or as near as we please to have it do, and equal to the maximum safe stress to which the metal may be subjected. This means that the stress should be a maximum and the same in every leaf. Certain practical considerations enter, however, which modify these conditions. In the first place it is not possible or even desirable to secure an absolutely uniform stress distribution throughout every part of the spring, and in the second place it is not possible to construct a spring which will break at once and everywhere when it is subjected to excessive deflections or become fatigued by use. Also since some leaves of a spring are subjected to reversals of stress more than other leaves, while some leaves are not reversed at all, and which stress reversals, as is well known, produce the phenomenon of fatigue more quickly than continued application of stress in the same direction, it becomes necessary to alter the stress distribution. Moreover, owing to the fact that the ultimate failure of the various elements of the spring must be taken into consideration, it is desirable to produce such a stress distribution as to cause only those leaves of the spring to fail first, the giving away of which will produce the least momentous consequences. I, therefore, contemplate in the preferred form of my invention the control of the stress distribution in such a way as to effect these results, while still maintaining the highest efficiency of the spring. Specifically, it is usually desirable to construct the spring in such a way that failure from the application of excessive forces, or from long-continued use shall occur first in the short plate or short plates of the spring and last in the master leaf. Such springs can be made other than indicated in my invention, but they are inefficient. The object of my present invention is to get the very highest efficiency. The advantage of the present construction, as has been referred to above, is that the load is ultimately supported by the master leaf and as long as the master leaf remains intact, the load is upheld, while when it breaks, it immediately places the machine of which it forms a part out of commission at once aside from possible danger. On the other hand, the breakage of the short plate or plates is of relatively slight consequence, as it does not result in the dropping of the load and the short plates are themselves the least expensive part of the spring and can be easily replaced. The breakage of these plates is furthermore, to be desired as it gives warning that the spring as a whole is in danger of failure, and permits steps to be taken to avoid either the causes which are tending to produce the failure of the spring as a whole, or to the renewal of the fatigued spring elements before the occurrence of any serious consequences which complete failure of the spring may bring about.

Another point to be considered is that the master leaf is the one usually subjected in the greatest measure to reversal stresses and in order to compensate for this and the normal downward load stresses in the master leaf, the range of stresses should be lower than in leaves not subjected to such reversal stresses. The preferred stress distribution will, therefore, be seen to be one in which the stresses are greatest in the short plates and decreases more or less toward the master leaf, being preferably always lowest in the master leaf itself and thereby producing a spring in which the short plate or plates will break first and in which the allowance is made for the reversal of stresses in the master leaf.

A greater uniformity of stress distribution throughout the length of the plates is also most desirable, not only as increasing the efficiency of the spring and making every part of the metal of each plate perform its work, but it is also desirable as relieving the stresses relatively toward the center of the plates and thereby lessening the tensional strains in the means employed for clamping the plates to the axle or other support. In this manner the box clips, which are commonly employed for clamping the spring in place, or whatever other means may be used for this purpose, are relieved from excessive strains; they are thus less liable to break and in many cases may be reduced in weight. The improvement in the stress distribution throughout the leaves results also in a better interaction of the several leaves, which has the advantage of lessening any tendency of the leaves to separate when the spring is deflected, a characteristic of springs as at present constructed which is objectionable as it causes the spring leaves to "gape" as it is called, or open up spaces between successive leaves. Such action prevents the spring from properly retaining the lubricant between the leaves and also permits water and grit to enter; the presence of water and grit causes abrasion and corrosion of the leaves and prevents the smooth sliding contact between the leaves and increases the friction, in turn resulting in making the spring "ride hard." All of these objections are overcome or lessened directly and indirectly by proper stress distribution, and combinations of various of the features referred to in the application of my principles may also be made so as to secure a stress distribution best adapted to the circumstances of any particular case. Accordingly I do not desire to limit myself to the use of all of the features of construction which I have described in any one spring, or of stress rectifying slots, or to particular lengths of overhang, or thicknesses of plates but intend to cover the principles of my invention broadly in whatever form they may be embodied. The results which I secure may be attained in various ways and by differing application of the principles which I have set forth.

This present application is a continuation in major part of an application filed by me September 16, 1914, Serial Number 861,951.

Having thus described my invention, what I claim as new herein and desire to secure by Letters Patent is:—

1. A laminated leaf spring having the leaves decreasing in thickness from the short plate to the master leaf.

2. A laminated leaf spring having the leaves decreasing in thickness from the short plate to the master leaf, the steps or overhangs decreasing in length from the short plate to the master leaf, or long plate.

3. A laminated leaf spring having the leaves decreasing in thickness from the short plate to the master leaf, the steps or overhangs decreasing in length from the short plate to the master leaf, the ends of certain leaves being tapered.

4. A laminated leaf spring having the leaves decreasing in thickness from the short plate to the master leaf, the steps or overhangs decreasing in length from the short plate to the master leaf, the ends of certain of the leaves being tapered in thickness.

5. A laminated leaf spring in which a number of the leaves comprise intermediate portions of substantial length and of uniform width and thickness, the end portions only of such leaves being tapered in thickness, the extremity of each shorter leaf overlapping the base of the taper in thickness of the next longer leaf.

6. A laminated leaf spring having the leaves decreasing in thickness from the short plate to the master leaf, the end portions only of the leaves being tapered, the extremities of the leaves overlapping portions of the tapers of the next longer leaf.

7. A laminated leaf spring having the leaves decreasing in thickness from the short plate to the master leaf, the steps or overhangs decreasing in length from the short plate to the master leaf, the end portions only of certain leaves being tapered and the extremities of the leaves overlapping portions of the tapers of the next longer leaf.

8. A laminated leaf spring having the leaves decreasing in thickness from the short plate to the master leaf, the steps or overhangs decreasing in length from the short plate to the master leaf, the end portions only of certain leaves being tapered in width and in thickness, the extremities of the leaves overlapping portions of the tapers of the next longer leaf.

9. A laminated leaf spring having the leaves decreasing in thickness from the short plate to the master leaf, the tapers increasing in length or fineness from the shorter to the longer leaves.

10. A laminated leaf spring having the leaves decreasing in thickness from the short plate to the master leaf, the steps or overhangs decreasing in length from the short plate to the master leaf, the ends of the leaves below the master leaf or long plate being tapered, and the ends of leaves below overlapping the bases of the tapers of the leaves above, the tapers increasing in length or fineness from the shorter to the longer leaves.

11. A laminated leaf spring having the leaves decreasing in thickness from the short plate to the master leaf, the steps or overhangs decreasing in length from the short plate to the master leaf, the ends of the leaves below the master leaf being tapered in width and in thickness, the ends of leaves below overlapping the bases of the tapers of the leaves above, the tapers increasing in length or fineness from the shorter to the longer leaves.

12. A laminated leaf spring having the leaves decreasing in thickness from the short plate to the master leaf, the ends of the leaves below the master leaf being tapered, the extremities of leaves below overlapping the bases of the tapers of the leaves above, the intermediate leaves being provided with stress rectifying slots in the regions overlapped.

13. A laminated leaf spring having the leaves decreasing in thickness from the short plate to the master leaf, the ends of the leaves below the master leaf being tapered in width and in thickness, the ends of leaves below overlapping the bases of the tapers of the leaves above, the tapers increasing in length or fineness from the shorter to the longer leaves, the intermediate leaves being provided with stress rectifying slots in the regions overlapped.

14. A laminated leaf spring having the leaves decreasing in thickness from the short plate to the master leaf, the steps or overhangs decreasing in length from the short plate to the master leaf, the ends of the leaves below the master leaf being tapered, the extremities of leaves below overlapping the bases of the tapers of the leaves above, the intermediate leaves being provided with stress rectifying slots in the regions overlapped.

15. A laminated leaf spring having the leaves decreasing in thickness from the short plate to the master leaf, the steps or overhangs decreasing in length from the short plate to the master leaf, the ends of the leaves below the master leaf being tapered in width and in thickness, the extremities of leaves below overlapping the bases of the tapers of the leaves above, the tapers increasing in length or fineness from the shorter to the longer leaves, the intermediate leaves being provided with stress rectifying slots in the regions overlapped.

16. A laminated leaf spring including a series of superposed leaves which are graduated in length to provide stepped overhanging ends, portions of metal being removed from zones of the leaves adjacent to and within the space covered by the ends of the next shorter leaf to increase the flexibility and equalize the stress in the leaves and at the same time provide lubricant receiving pockets, one of the outermost leaves being provided with a lubricant reservoir from which lubricant will work its way between the ends of the leaves and into the various receiving pockets.

17. A laminated leaf spring including a series of superposed leaves which are graduated in length to provide stepped overhanging ends, the longest leaf terminating in an eye, and portions of metal being removed from zones of the shorter leaves adjacent to the ends thereof to increase the flexibility and equalize the stress in the leaves, and at the same time provide lubricant receiving pockets, a lubricant reservoir being provided at the eye of the longer leaf from which lubricant will work its way between the ends of the leaves and into the various lubricant receiving pockets.

18. A laminated leaf spring including a series of superposed leaves which are graduated in length so as to provide steps between the ends of the successive leaves, portions of metal being removed from zones of the leaves adjacent to the ends thereof and covered by the adjacent leaves to increase the flexibility and equalize the stress in the leaves.

19. A laminated leaf spring including a series of superposed leaves which are graduated in length to provided stepped overhanging ends said ends being tapered and the extremity of each shorter leaf overlapping the base of the tapered end of the next longer leaf and portions of metal being removed from zones of the leaves adjacent to the base of the tapers thereof to increase the flexibility and equalize the stress in the leaves.

20. A laminated leaf spring including a series of superposed leaves which are graduated in length so that the steps between the ends of the successive leaves gradually decrease in length from the shorter leaf to the master leaf, the ends of the leaves being tapered, and portions of metal being removed from zones of the leaves adjacent to the tapered ends thereof and within the zones covered by the next shorter leaf to equalize the stress in the leaves.

21. A laminated leaf spring including a series of superposed leaves which are graduated in length so that the steps between the ends of the successive leaves gradually decrease in length from the shorter leaf to the master leaf, or long plates, the ends of the leaves being tapered in width and thickness and the base of the tapered end of each longer leaf being overlapped by the extremity of the next shorter leaf, portions of metal being removed from zones of the leaves adjacent to the tapered ends and within the areas covered by the next shorter leaf thereof to increase the stress thereat and therefore equalize the stress in the leaves.

22. A leaf for a laminated spring, having a taper in the plane of its thickness, said tapered portion having the outlines of a trapezoid.

23. A leaf for a leaf spring having a taper in the plane of its thickness, said taper having the outlines of a trapezoid and containing a stress rectifying slot adjacent to the base of said taper.

24. A leaf for a leaf spring having a taper in the plane of its thickness, said taper having the outlines of a trapezoid and containing a stress rectifying slot within the area of the portion so tapered.

25. A laminated leaf spring having the leaves decreasing in thickness from the short plate to the master leaf and including a group or groups of leaves of the same thickness.

26. A laminated leaf spring in which the extremities of certain of the leaves have a taper in the plane of the thickness, said taper having the outlines of a trapezoid and also being tapered in the plane of the width said taper having the outlines of a parabola.

27. A laminated leaf spring including one or more leaves provided with stress rectifying slots between the perch and the ends of the leaves.

28. A laminated leaf spring including one or more leaves having their end portions tapered, and having stress rectifying slots adjacent to the bases of the tapers.

29. A laminated leaf spring including one or more leaves provided with tapered ends and stress rectifying slots within the portions which are tapered.

30. A laminated leaf spring including leaves formed with tapered ends and having metal removed from portions between the perch and end and within areas covered by the adjacent upper and lower leaves to reduce the weight, equalize the stresses and increase the safe and permissible load.

31. A laminated leaf spring in which the section moduli of the tapered leaves are reduced to rectify the stress adjacent to the points where such leaves are supported by the ends of underimposed shorter leaves.

32. A laminated leaf spring having a plurality of leaves of varying length, the steps between the leaves increasing from the longer plates to the shorter plate, the section modulus of each tapered leaf being suddenly decreased in the region adjacent to and within the portion covered by the next adjacent upper and lower leaves.

33. A laminated leaf spring comprising a master leaf composed of a plurality of relatively thin plates and a plurality of thicker supporting plates.

34. A laminated leaf spring including a master leaf, and tapered supporting leaves gradually decreasing in length to provide overhangs or steps, some or all of said tapered supporting leaves having the value of the section modulus varied so as to produce a stress distribution characterized by the rapid increase in stress intensity from the extremity of the leaf to a point adjacent to the point of support of said leaf upon the extremity of the next shorter leaf, the stress intensity then increasing slowly and progressively to the center of the leaf.

35. A leaf for a laminated leaf spring tapered in the plane of its thickness and width and containing a stress-rectifying slot within and beyond the area of the portion so tapered.

36. A laminated leaf spring in which the section moduli of the tapered leaves are reduced rapidly adjacent to the point where such leaves are supported by the ends of the underimposed shorter leaves.

37. A laminated leaf spring having a master leaf terminating in an eye, the leaves below the master leaf being provided with lubricating openings, a lubricant reservoir being provided at the eye of said master leaf from which lubricant will work its way into and through said lubricant openings in the lower leaves.

38. A laminated leaf spring comprising a plurality of plates of unequal length providing steps or overhangs, the end portions of the plates being tapered in thickness, the tapers being such that the flexibility of the overhanging portions of the plates is less than the flexibility of a corresponding cantaliver beam of uniform strength loaded at the extremity.

39. A laminated leaf spring having leaves of graduated length to produce steps or overhangs, the length of the steps or overhangs decreasing from the shorter toward the longer plates, the leaves being so formed and proportioned that the reactions between the leaves increase from the short plate to the final reaction between the master leaf and the long plate, said final reaction being insufficient to cause the master leaf to break first.

40. A laminated leaf spring comprising leaves of graduated lengths producing overhangs or steps decreasing in length from the shorter to the longer plates, certain of the plates having tapered ends, the tapers increasing in fineness from the shorter toward the longer plates.

41. A laminated leaf spring having leaves of graduated lengths producing steps or overhangs decreasing in length from the shorter toward the longer plates, the ends of the plates being tapered, the end of each shorter plate overlapping the base of the taper of the next longer plate.

42. A laminated leaf spring having slots formed near the ends of certain of the leaves in the regions overlapped by the end portions of the next shorter leaves, portions of the edges of the slot walls being chamfered so as to cause the feeding of lubricant through the slots and between the successive leaves.

DAVID LANDAU.

Witnesses:
 WM. P. HAMMOND,
 P. FRANK SONNEK.